(12) United States Patent
Bent

(10) Patent No.: US 8,812,519 B1
(45) Date of Patent: Aug. 19, 2014

(54) FACE PHOTOGRAPH-BASED DATING RECOMMENDATION SYSTEM

(71) Applicant: Jonathan Binnings Bent, Los Angeles, CA (US)

(72) Inventor: Jonathan Binnings Bent, Los Angeles, CA (US)

( * ) Notice: Subject to any disclaimer, the term of this patent is extended or adjusted under 35 U.S.C. 154(b) by 0 days.

(21) Appl. No.: 13/767,082

(22) Filed: Feb. 14, 2013

Related U.S. Application Data

(63) Continuation-in-part of application No. 12/876,197, filed on Sep. 6, 2010, now abandoned.

(51) Int. Cl.
*G06F 17/30* (2006.01)

(52) U.S. Cl.
CPC ................... *G06F 17/3053* (2013.01)
USPC .... 707/748; 707/723; 707/758; 707/E17.019; 705/319

(58) Field of Classification Search
CPC ................ G06F 17/3053; G06F 17/30244
USPC ................. 707/748, 749, 758, 759, 915, 723, 707/E17.019; 705/319
See application file for complete search history.

(56) References Cited

U.S. PATENT DOCUMENTS

| | | | |
|---|---|---|---|
| 6,370,513 B1 | 4/2002 | Kolawa et al. | |
| 7,430,315 B2 | 9/2008 | Yang et al. | |
| 7,519,200 B2 * | 4/2009 | Gokturk et al. | 382/118 |
| 7,657,493 B2 | 2/2010 | Meijer et al. | |
| 7,684,651 B2 * | 3/2010 | Tang et al. | 382/305 |
| 7,907,755 B1 * | 3/2011 | Perlmutter et al. | 382/118 |
| 8,478,728 B2 * | 7/2013 | Villa et al. | 707/666 |
| 8,589,457 B1 * | 11/2013 | Bengio et al. | 707/821 |
| 2004/0122810 A1 * | 6/2004 | Mayer | 707/3 |
| 2005/0086211 A1 * | 4/2005 | Mayer | 707/3 |
| 2006/0018522 A1 * | 1/2006 | Sunzeri et al. | 382/118 |
| 2007/0124226 A1 * | 5/2007 | Garner | 705/35 |
| 2008/0052312 A1 * | 2/2008 | Tang et al. | 707/104.1 |
| 2009/0299961 A1 * | 12/2009 | Lo | 707/3 |
| 2010/0135584 A1 * | 6/2010 | Tang et al. | 382/218 |
| 2011/0129145 A1 * | 6/2011 | Perlmutter et al. | 382/159 |
| 2012/0030193 A1 * | 2/2012 | Richberg et al. | 707/719 |
| 2012/0281910 A1 * | 11/2012 | Perlmutter et al. | 382/159 |
| 2013/0113814 A1 * | 5/2013 | Howard | 345/522 |

FOREIGN PATENT DOCUMENTS

| | | |
|---|---|---|
| KR | 10-2000-0054824 A | 9/2000 |
| KR | 10-0338807 B1 | 5/2002 |

OTHER PUBLICATIONS

Hari, R. Kujala M. V. Brain Basis of Human Social Interaction: From Concepts to Brain Imaging. Physiol Rev 89: 453-479, 2009; doi:10.1152/physrev.00041.2007.

* cited by examiner

*Primary Examiner* — Phong Nguyen

(57) ABSTRACT

Methods and apparatus for vision based dating recommendations which analyze face photographs in a members database and recommends potential dating partners. A user selects faces the user finds attractive or unattractive from an objectively diverse group of member photographs. Member faces are mapped and compared with defining data extracted from the attractive and unattractive face selections made by the user to present to the user a ranking of photographs from most to least attractive. The user may continue to select attractive and unattractive face photographs allowing for a more refined and accurate ranking of faces attractive to the particular user. The ranked face data may be combined with narrative compatibility data to present to the user members the user is most likely to find compatible as well as attractive.

12 Claims, 6 Drawing Sheets

| # User | A1 | A2 | A3 | ... | A23 | A24 |
|---|---|---|---|---|---|---|
| Bob | 1 | 1 | 4 | ... | 1 | 2 |
| Jane | 3 | 3 | 5 | ... | 1 | 5 |
| Mike | 1 | 2 | 1 | ... | 3 | 3 |
| ... | ... | ... | ... | ... | ... | ... |

FIG. 3

| My Personality | | | | | | QUESTIONNAIRE: step 3 of 5 |
|---|---|---|---|---|---|---|
| Describe your personality by rating each of the following words. | | | | | | |
| | Least Accurate | Slightly Less Accurate | Medium Accuracy | Slightly Accurate | Most Accurate | |
| Assertive | ○ | ○ | ○ | ○ | ○ | |
| Energetic | ○ | ○ | ○ | ○ | ○ | |
| Extroverted | ○ | ○ | ○ | ○ | ○ | |
| Quiet | ○ | ○ | ○ | ○ | ○ | |
| Reserved | ○ | ○ | ○ | ○ | ○ | |
| Shy | ○ | ○ | ○ | ○ | ○ | |
| | Least Accurate | Slightly Less Accurate | Medium Accuracy | Slightly Accurate | Most Accurate | |
| Cold | ○ | ○ | ○ | ○ | ○ | |
| Cooperative | ○ | ○ | ○ | ○ | ○ | |
| Demanding | ○ | ○ | ○ | ○ | ○ | |
| Kind | ○ | ○ | ○ | ○ | ○ | |
| Selfish | ○ | ○ | ○ | ○ | ○ | |
| Sympathetic | ○ | ○ | ○ | ○ | ○ | |
| | Least Accurate | Slightly Less Accurate | Medium Accuracy | Slightly Accurate | Most Accurate | |
| Careless | ○ | ○ | ○ | ○ | ○ | |
| Efficient | ○ | ○ | ○ | ○ | ○ | |
| Inconsistent | ○ | ○ | ○ | ○ | ○ | |
| Organized | ○ | ○ | ○ | ○ | ○ | |
| Practical | ○ | ○ | ○ | ○ | ○ | |
| Sloppy | ○ | ○ | ○ | ○ | ○ | |
| | Least Accurate | Slightly Less Accurate | Medium Accuracy | Slightly Accurate | Most Accurate | |
| Calm | ○ | ○ | ○ | ○ | ○ | |
| Irritable | ○ | ○ | ○ | ○ | ○ | |
| Jealous | ○ | ○ | ○ | ○ | ○ | |
| Moody | ○ | ○ | ○ | ○ | ○ | |
| Optimistic | ○ | ○ | ○ | ○ | ○ | |
| Patient | ○ | ○ | ○ | ○ | ○ | |

FIG. 4

FACE PHOTOGRAPH-BASED DATING RECOMMENDATION SYSTEM

CROSS-REFERENCE

This U.S. Patent Application is a continuation-in-part of, and claims the benefits of, U.S. patent application Ser. No. 12/876,197 filed Sep. 6, 2010, entitled "Computerized Face Photograph-Based Dating Recommendation System," currently pending, the contents of which are incorporated in their entirety by this reference.

FIELD OF THE INVENTION

The present invention relates to methods and apparatus for vision based dating recommendations.

BACKGROUND OF THE INVENTION

The Internet and technology have evolved significantly over past decades. With the speedy development of the internet, applications have grown rapidly such as search engines, blogs, social networking websites, e-commerce websites, etc.

In these applications, social networking websites have become more and more popular. These websites enable users to create a profile of their personal information, keep in touch with their friends and even meet new people with similar interests. Some of the social websites are dating websites which users join with the goal of finding suitable persons to date.

Dating websites typically contain large numbers of members and member data in regards to which matching and searching is necessary to aid the users in finding suitable persons to date. In attempts to solve the problem, search methods have been created, one of which is disclosed in U.S. Pat. No. 7,657,493. However, these search methods are primarily based on preset narrative search conditions, or non-visual personal attributes, like age, interests, location, salary, etc. While sorting for common interests, educational background, age, salary and other such criteria is a simple database storage and search function, these methods do not provide search options regarding visual attributes such as physical attractiveness.

In the area of e-commerce, the structure of e-commerce websites have become more and more complex rendering it difficult for consumers to find the products and service they desire. To address this problem, recommendation methods have been proposed that suggest products and that provide consumers with information to help them decide which products to purchase. Such a recommendation method is disclosed in U.S. Pat. No. 6,370,513.

Known recommendation methods in e-commerce identify relationships between different products based upon, for example, customer purchase history. In dating sites, the subjects of the selection process are human beings not products, for which history would typically be unavailable.

Conventional e-commerce recommendation methods are not capable of meaningfully addressing the difficulty within dating websites of identifying another member who is attractive to the user of the site.

The face is one of the most important and distinctive features of a human being. To locate the similar faces between an input image and each image in a database of faces, some general face recognition methods are used, one of which is disclosed in U.S. Pat. No. 7,430,315.

Existing face recognition methods typically only recognize a face and find the similarity to other face images. However, they do not maximize the real behavioral and emotional components of what a user may find attractive or unattractive among the faces throughout the members in the dating website. It is important to note, that similarity is not the same as attraction. Saying a picture is similar to another picture that you like does not measure how much you like the original picture versus the similar picture, it only states that the images are within a range of closeness to being the same or being identical. A user stating he or she likes an image and that another image is not similar to the image the user likes is in no way saying the user does not like the non-similar image, it is only saying that the images are not similar. In fact, the user may also like the non-similar image. This misconception, that because faces are similar the user is likely to be attracted to both, or because faces are dissimilar the user is likely to be attracted to just one and not the other, is an area where current computer face selection methods miss the mark when it comes to dating websites.

It is difficult to find people to whom an individual user is attracted by appearance, especially among the large number of members on dating websites. Manual searches are time consuming and impractical. In attempts to solve the problem, face similarity search methods have been created such as the one disclosed in U.S. Pat. No. 7,907,755. However, as with traditional face recognition methods, in this disclosed computerized method a single face image a user selects is compared to other face images to find those most similar to that one image. These results are limited to faces having similar facial characteristics to the single face selected by the user. For example, if a user selects an image of Jennifer Aniston, the user will be presented similar faces to Jennifer Aniston, and not faces similar to the multiple other face types the user may also find attractive. A problem which the instant invention overcomes, is that the aforementioned method starts with a user's pre-identified notion of one or more individuals selected for similarity, none of which may be similar to face images within the database of members which the user might nevertheless find attractive. In other words, the user may request the system find similar faces to a single query face of Jennifer Aniston, but there may not be any faces that are similar to Jennifer Aniston's in the members' database, but the members' database may in actuality contain many different face types that the user may find equally attractive but that are not similar to Jennifer Aniston.

Further according to the aforementioned method, the approach of allowing additional user selection criteria only adds another narrow search criteria to the process. For example, allowing the user to request similarity for parts of the face, e.g., eyes, nose, mouth, etc., to be searched individually from the whole face makes for a non-comprehensive approach that, like the initial approach of locating similar faces, fails to account for the emotional and subjective manner in which individuals evaluate the attractiveness of others. This conscious partitioning of individual parts of the face (e.g. eyes, nose, mouth, etc.) demonstrates a clear lack of understanding of how the human subconscious perceives faces as attractive. To one user, the same mouth may be found attractive on one face but unattractive on another. Consciously singling out facial parts does not assist in predicting whether a user will find another given face attractive.

In addition to a user having faces he or she finds attractive, the user will also have faces he or she finds unattractive. Ignoring the unattractive faces creates its own set of limitations that have yet to be addressed by known face selection methods.

The cellular processes of the brain that respond emotionally to a face are subconscious processes which are extremely complex and which respond to the face as a whole, not as a sum of individual face parts. Attraction is an emotional response that is specific to each individual based on each individual's lifetime of experiences.

When using dating sites, finding face types to which a user is attracted but which cannot be identified as words in a profile is often most important to guide users in finding their potential matches among members. Much useful information that is hidden in people's subconscious perception of another's face photograph is not used in the website's search and/or match process, and therefore lost, in conventional face selection methods.

Just like the internet and technology's speedy evolution, our understanding of how the human mind functions has evolved. For example, research indicates the mental process of being attracted or not-attracted to a unique face is a combination of visual recognition followed by emotional response. These two processes occur in separate regions of the brain. A face is seen and recognized as a unique face, then a separate mental process reacts to that face emotionally. Hari, Riitta, Miiamaaria, V. Kujala. *Brain Basis of Human Social Interaction: From Concepts to Brain Imaging* Physiol Rev April 2009 vol. 89 no. 2 453-479. We are able to consciously identify that we see a face, and describe the face we see, but why we have the emotional reaction that follows the recognition is a subconscious, complex process based on a lifetime of experiences starting from birth. Unlike products where the details as to why we like one over another are easy to put in words, the details as to why one face attracts us and another similar face does not is most often a feeling we recognize but cannot explain with words. In conventional recommendation methods, enjoyable and appealing products are recommended. An organizing method in the context of dating sites which can largely reduce search scopes for users is extremely important. But with limited understanding of how the human brain processes face types and emotional response, current vision dating recommendation methods and e-commerce search methods fall short.

The method of the subject invention is dependent on the involvement of the individual user, and the individual user's assessment of a face or faces as attractive or unattractive, and does not in any way rely, as do some of the prior art, on the assessment of any other person regarding face similarity. So, for example, there are no "training users," or "human assessors", i.e., no human agents who perform an identifying and scoring function with respect to multiple photographs in order to provide a basis for identifying faces as similar. Rather, the determination of importance in the context of the instant invention is based solely on the individual user's selections of attractive and unattractive, and not based on any other person's assessments whatsoever.

SUMMARY OF THE INVENTION

In consideration of the above-mentioned problems with conventional methods and in order to accomplish a date recommendation service using image information, the present invention provides a vision based dating recommendation method which can identify or select members images to which an individual user is attracted and not-attracted. The present invention: (1) provides an individual user with an objectively diverse multiple image seed group, (2) the ability to make simultaneous multiple selections of member images for data extraction, (3) employs the user selections of both attractive and unattractive face images to determine an importance score, (4) mines and organizes members in the database by their narrative profiles into two or more subgroups, (5) within each subgroup, ranks members in the database by their image data from most to least attractive to the user, and (6) optionally provides the user with additional attractive and/or unattractive face image selections for continued refinement of date recommendation results.

A first aspect of the present invention is a vision based dating recommendation method comprising an objectively diverse multiple image seed group generated from face images of members independent of any user input. The word "members", as used with respect to the instant invention, refers to individuals available for dating other than the user. As used herein and explained in greater detail below, the phrase "objectively diverse seed group" refers to those face images which, after mapping, are determined to be the most mathematically diverse from the others. "Mapping" refers to assigning numerical values to various predetermined aspects of facial features so that the facial features of one face image can be objectively compared and contrasted with the analogous facial features of another face image.

A second aspect of the present invention is a vision based dating recommendation method comprising an individual user making simultaneous selections of multiple face images the user finds attractive or unattractive within the seed group, and simultaneously submitting these selections for scoring; measuring and scoring of the simultaneously submitted face images which the user found attractive or unattractive; and scoring the data importance between attractive selected images and unattractive selected images. As used herein, a "seed group" refers to a sample of face images selected from an entire database of images to be presented to the user for user selection.

A third aspect of the present invention is a vision based dating recommendation method comprising scoring of all members' images in the database based on the seed group attractive and unattractive selections made by the user and the importance scores resulting from the seed group selections. As used herein, "scoring" of individual face images refers to a process of applying mapped face data to an algorithm in order to assign an order or rank to the face images within the image database.

A fourth aspect of the present invention is a vision based dating recommendation method comprising using data mining of the user's and all members' narrative (non-image) profile input in the database, and matching and organizing members into two or more narrative subgroups. As used herein, the term "mining" refers to the process of extracting relevant data/information from stored data.

A fifth aspect of the present invention is a vision based dating recommendation method comprising ranking and organizing each member's face image in the database, based on their measured score, from most attractive to least attractive within each of the narrative subgroups.

A sixth aspect of the present invention is a vision based dating recommendation method comprising presenting to the user the scored, matched, ranked and organized narrative and image data as a members dating recommendation match list.

A seventh aspect of the present invention is vision a based dating recommendation method comprising a continuation of the members' image scoring based on the selections made by the user in the seed group wherein the user continues to make selections within the members recommendation match list of who they find attractive or unattractive, after which the member images within the member recommendation match list are re-scored, reorganized, and then redisplayed for the user from most attractive to least attractive.

An eighth aspect of the present invention is a vision based dating recommendation method comprising using a scale of attractiveness that is greater than binary (alphabetical, numerical, symbol scale, or any other kind) for the user to make more precise indications of the gradation of attractiveness and unattractiveness of the displayed member images, e.g., ++/most-attractive, +/somewhat-attractive, −/somewhat-unattractive, −−/most-unattractive.

With respect to each aspect of the present invention, a vision based dating recommendation method includes computer vision.

BRIEF DESCRIPTION OF THE DRAWINGS

FIG. 3 is a table illustrating the recording of stored data of a user's or member's narrative input.

FIG. 4 shows part of a member's sample profile questionnaire.

DETAILED DESCRIPTION OF THE INVENTION

The present invention is described below referring to the accompanying drawings, wherein like numerals refer to like or corresponding elements throughout. It should be understood, however, that the drawings and detailed description relating thereto are not intended to limit the claimed subject matter to the particular form or embodiment disclosed. Rather, the intention is to cover all modifications, equivalents and alternatives falling within the spirit and scope of the claimed subject matter.

Figure 1:
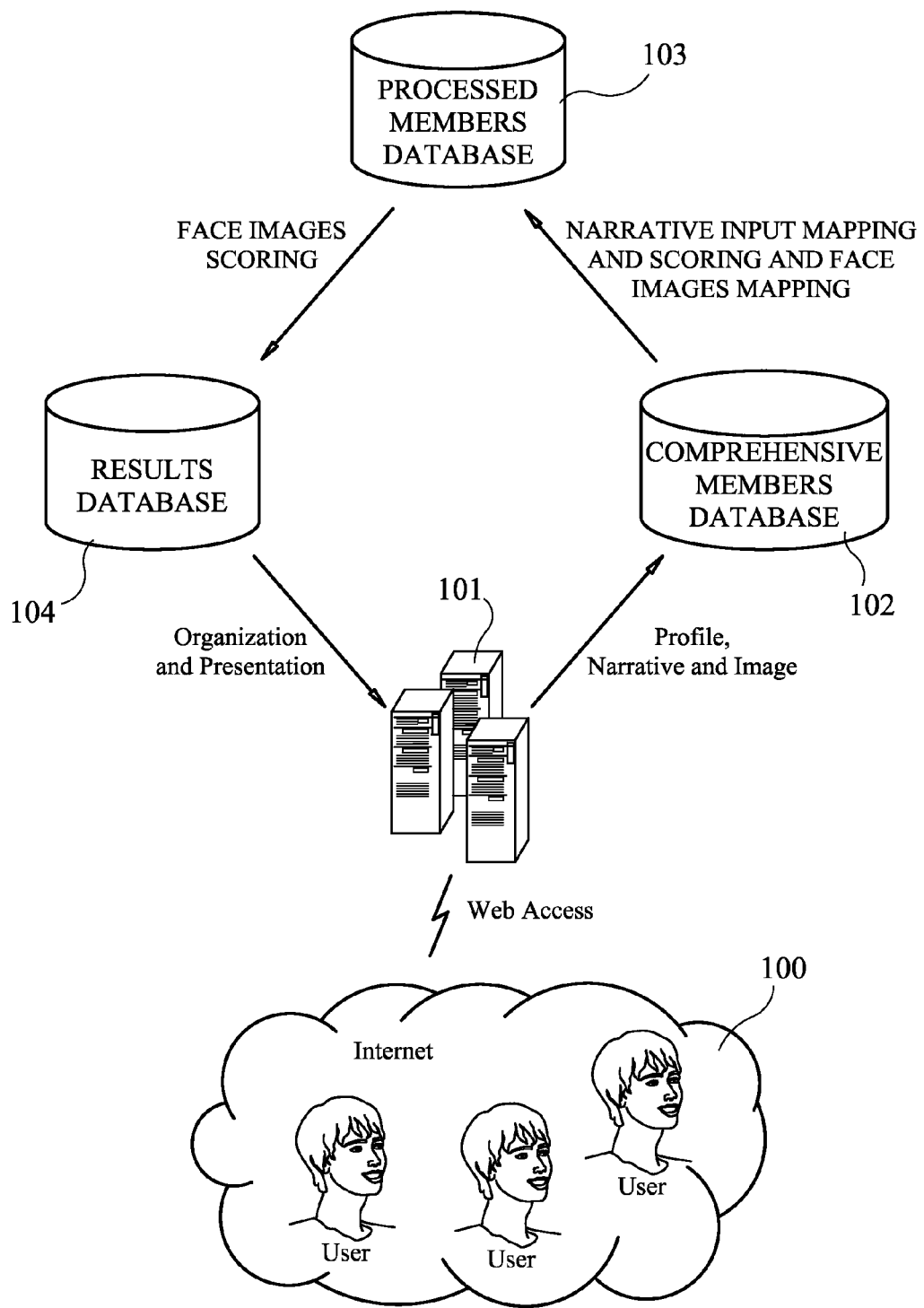
FIG. 1 is a flow diagram of a preferred embodiment of the proposed method for vision based dating recommendation using computers and deployed over a network.

Referring initially to FIG. 1, a flow chart of a preferred embodiment of the dating recommendation method of the present invention presented in the context of a dating service using computers and deployed over a network, users 100 access a system server 101 over a public or private network, as for example the Internet. A comprehensive members database 102 stores and updates members' narrative profiles, face images, and or other member registration and profile information. Face images stored in 102 are mapped and stored in a members' processed database 103, while narrative data stored in 102 are mined and scored and then stored in members' processed database 103. The mapped face images stored in database 103 are scored using attractive/unattractive importance data (explained below) obtained from user selections, together with mapped difference data (also explained below), and stored in a results database 104. Data from results database 104 are processed for organization and presentation of member profiles in real time, with output results provided to users 100 through system server 101.

Figure 2:
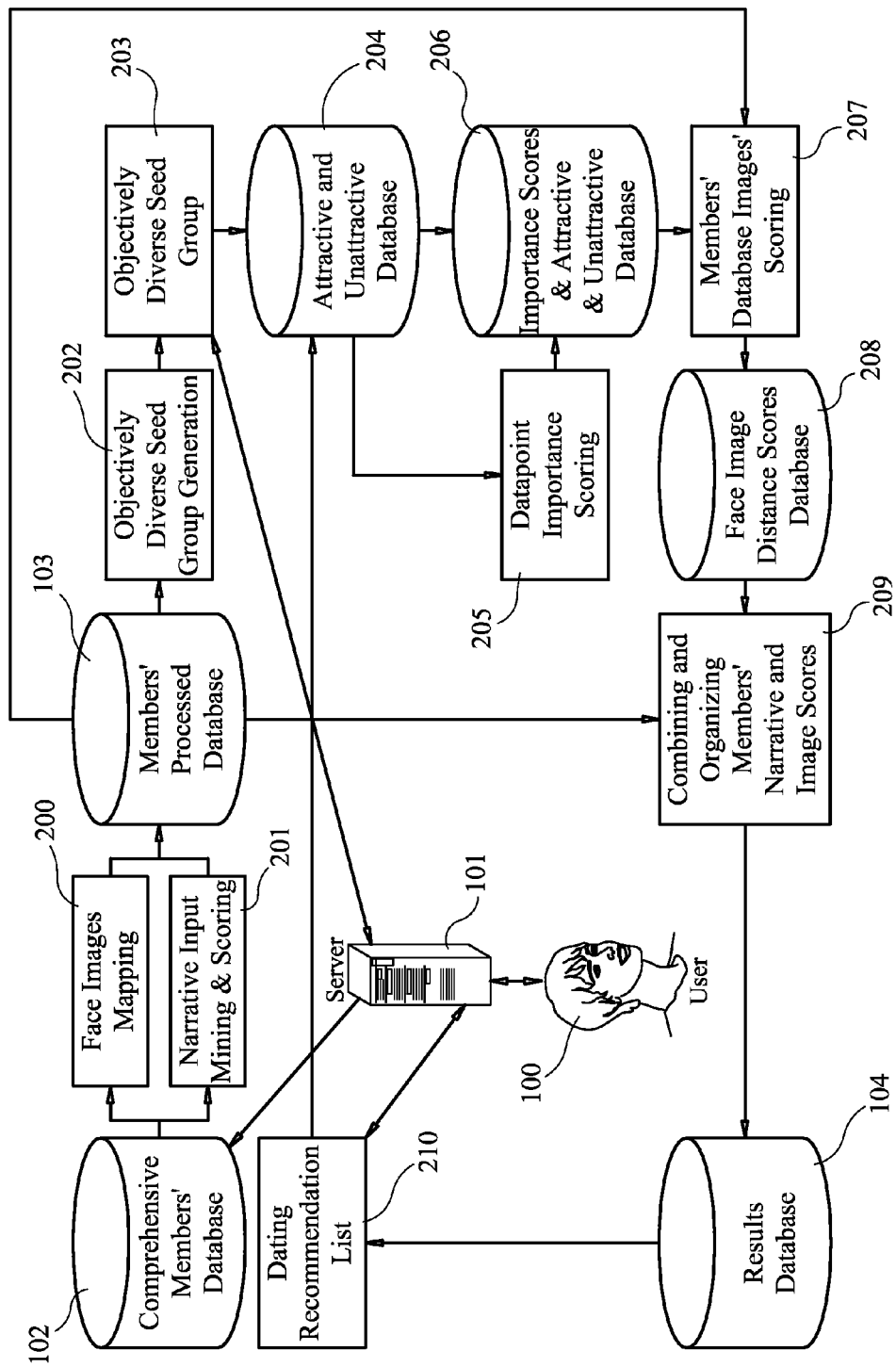
FIG. 2 provides further detail of the preferred embodiment depicted in FIG. 1 as a flow chart of the proposed framework and structure for the computer vision based dating recommendation method and system of the present invention.

Depicted in FIG. 2 is a more detailed flow diagram illustrating the general framework and structure of a preferred embodiment of the method of the subject invention depicted in FIG. 1. Data from the comprehensive members' database 102 is processed and stored in a members' processed database 103. For the purpose of the invention, certain data are ignored, e.g., username, email, password, etc., while useful data are processed, e.g., user image, narrative questionnaire answers, age range desired, sex desired, personality information, etc.

In a face mapping step 200, facial data for all images from database 102 are extracted and mapped. Facial data can be extracted by different methods including, Principal Components Analysis (PCA), Independent Component Analysis (ICA), Linear Discriminate Analysis (LDA) or geometric features extraction, but are not limited to the above methods.

A narrative scoring step 201 mines, using known data mining technologies, the relationship between different member profiles through their narrative (non-image) input and scores members according to how closely each members' narrative input matches the stated narrative desires of the user as well as how closely the user matches the stated narrative desires of each member. Narrative scoring step 201 scores all members' narrative input and stores that information in the members' processed database 103.

All information obtained from the face mapping step 200 and narrative scoring step 201 is stored in a members' processed database 103. A seed group generator 202 generates an objectively diverse seed group 203 as described in greater detail below. The interest of the user is best served if seed group 203 is sufficiently large and objectively diverse in order to avoid an image selection process that is narrow. An objectively diverse seed group avoids a common flaw with existing computer vision based recommendation methods used for online dating. The common flaw is using a limited, narrow, or small start group/seed sample/query image.

FIG. 3 illustrates a manner of storing ranked data with respect to members' narrative profile input. According to the embodiment of narrative data storage depicted in FIG. 3, data points A1, A2, ... A24 are examples of the narrative attributes from a page of the questionnaire illustrated in FIG. 4 of a member's profile. For example, in FIG. 4. the content in the "Personality" assessment section of the questionnaire can be regarded as narrative attributes. "Assertive" is coded A1, "Energetic" A2, ... , "Patient" A24, etc. In FIG. 4. each attribute has five possible rankings: "Least Accurate", "Slightly Not Accurate", "Medium Accuracy", "Slightly Accurate", "Most Accurate". These five selection rankings can be quantified as 5 numbers from 1 through 5.

When a new member registers into the dating website, the member will be required to input his or her narrative data by filling out the questionnaire, a portion of which is illustrated in FIG. 4 and the user's questionnaire answers will be processed into data like the A1=2, A2=3, ... , A24=5 data points depicted in FIG. 3, etc.

Referring again to FIG. 2, seed group generator 202 generates an objectively diverse seed group from among the member face images of members who are within the user's desired age range and sex, as follows: Seed group generator 202 randomly selects a first face image $X_1$, from the members' processed database 103. Seed group generator 202 selects the next face image in the members' processed database 103 whose mapped face image is furthest from/least like $X_1$ and adds it to the seed group as $X_2$. Generator 202 then selects the next face from database 103 whose mapped face image is furthest from the two seed group faces $X_1$ and $X_2$, and adds it to the seed group as $X_3$. Generator 202 then selects the next face from database 103 whose mapped face image is furthest from the three faces, $X_1$, $X_2$ and $X_3$, and adds it to the seed group as $X_4$, and so on ... through $X_n$, until the predetermined seed group number (in this embodiment 24) has been selected. Generator 202 thus generates an objectively diverse seed group of 24 member images to be presented to the user as seed group 203 for manual attractive and/or unattractive selection by the user through system server 101.

Through server 101 the user is therefore presented with a group of face images that are as diverse as possible from each other, i.e., the objectively diverse seed group 203. This allows the invention to insure the broadest possible variety of facial appearances within the seed group and avoids a narrow appearance selection process which would unnecessarily limit the variety of face types presented to the user. In one preferred embodiment, the user can make manual attractive "+" or unattractive "−" selections with respect to each face image in the seed group through system server 101.

Also according to one embodiment, in the event the user does not make the minimum number of attractive "+" or unattractive "−" face image selections required (in this example, the minimum number being 5), an additional seed group population 203' (not illustrated) is presented to the user. The additional seed group population 203' is generated by seed group generator 202 in the same manner as disclosed above, i.e. by selecting $X_{25}$ thru $X_{48}$.

As illustrated in FIG. 2, user 100 accesses the dating website and member database 102 through system server 101. When registering into the website, the user inputs his/her personal profile which consists of answering narrative (non-image) questions about his/her self and his/her ideal match. The user also uploads his/her own face image to be stored in member database 102. For example, a user 100 first inputs his profile via a questionnaire. The resulting profile may be, for example: white/Caucasian, male, age 30, 6'1", outgoing, energetic personality, seeking a female age 25 to 35, etc. In one preferred embodiment, based on the user's narrative profile input of only the sex and age range of their desired match, seed group generator 202 selects 24 face images that fit that narrative and are objectively diverse in appearance each from the others. These 24 diverse face images are then presented to the user through system server 101 as seed group 203.

Once presented with objectively diverse seed group 203, the user can make selections among seed group 203 images the user finds attractive "+" or unattractive "−". The selections are stored in an attractive and unattractive database 204. The user selections are based on whole face images which minors the way the brain processes emotional responses to faces. Stored attractive "+" and unattractive "−" data from database 204 are processed for datapoint importance scores in step 205. Datapoint importance scoring is explained in further detail below.

In an alternative embodiment, not illustrated, user 100 is asked to make selections from objectively diverse seed group 203 using a scale of attractiveness that is greater than binary (alphabetical, numerical, symbol scale, or any other kind) in order that user 100 may make more precise indications of the gradation of attractiveness and unattractiveness of the displayed seed images. So, for example, user 100 may be asked to rank seed group 203 images as ++/most-attractive, +/somewhat-attractive, −/somewhat-unattractive, −−/most-unattractive. This provides additional information to be used in the importance scoring in step 205 and images scoring in step 207, and potentially a more accurate or more efficient result.

Stored attractive "+" and unattractive "−" data from database 204 and datapoint importance scores from step 205 are stored in an importance scores and attractive and unattractive database 206. Importance and attractive and unattractive data from 206 are used in step 207 to determine and assign minimum face image distance scores to all images from database 103. Data processed in 207 is stored in members' face image distance scores database 208.

Data from database 208 and narrative data from 103 are combined in step 209 which first organizes all of the members' narrative profile information from the members' processed database 103 into two or more subgroups ranked according to how closely the members' narratives match the desired narratives of the user and how closely the user's narrative matches the desired narratives of the members.

In one embodiment of the invention, the narrative profile scores can be grouped into 3 subgroups based on matching percentage as, for example, the 100th to the 85th percentile group, the 84th to the 75th percentile group, and the 74th to the 0 percentile group. In another embodiment of the invention, the subgroup percentiles can be set by the user.

Within the narrative subgroups, step 209 ranks and organizes the member profiles using only their Face Image Distance Scores from minimum "attractive" face distance score to minimum "unattractive" face distance score, or in other words, from most attractive to least attractive to the user. This avoids the pitfall of existing dating recommendation methods which only rely on the face distance/similarity scores of an individual attractive selected face or query face and wrongfully assuming the furthest from those would be the least attractive. Merely because a face image scores furthest from a face image which has been selected as attractive, does not necessarily mean that the individual user would not find that face attractive. For example, with objectively generated seed group 203, a first random face $X_1$ might be selected as attractive by the individual user, but that does not suggest that the next face $X_2$ could not also be found to be attractive by the user. Conversely, with the objectively generated seed group, a first random face $X_1$ might be selected as unattractive by the user, but that does not suggest that the next face $X_2$ could not also be found to be unattractive by the user.

Figure 6:
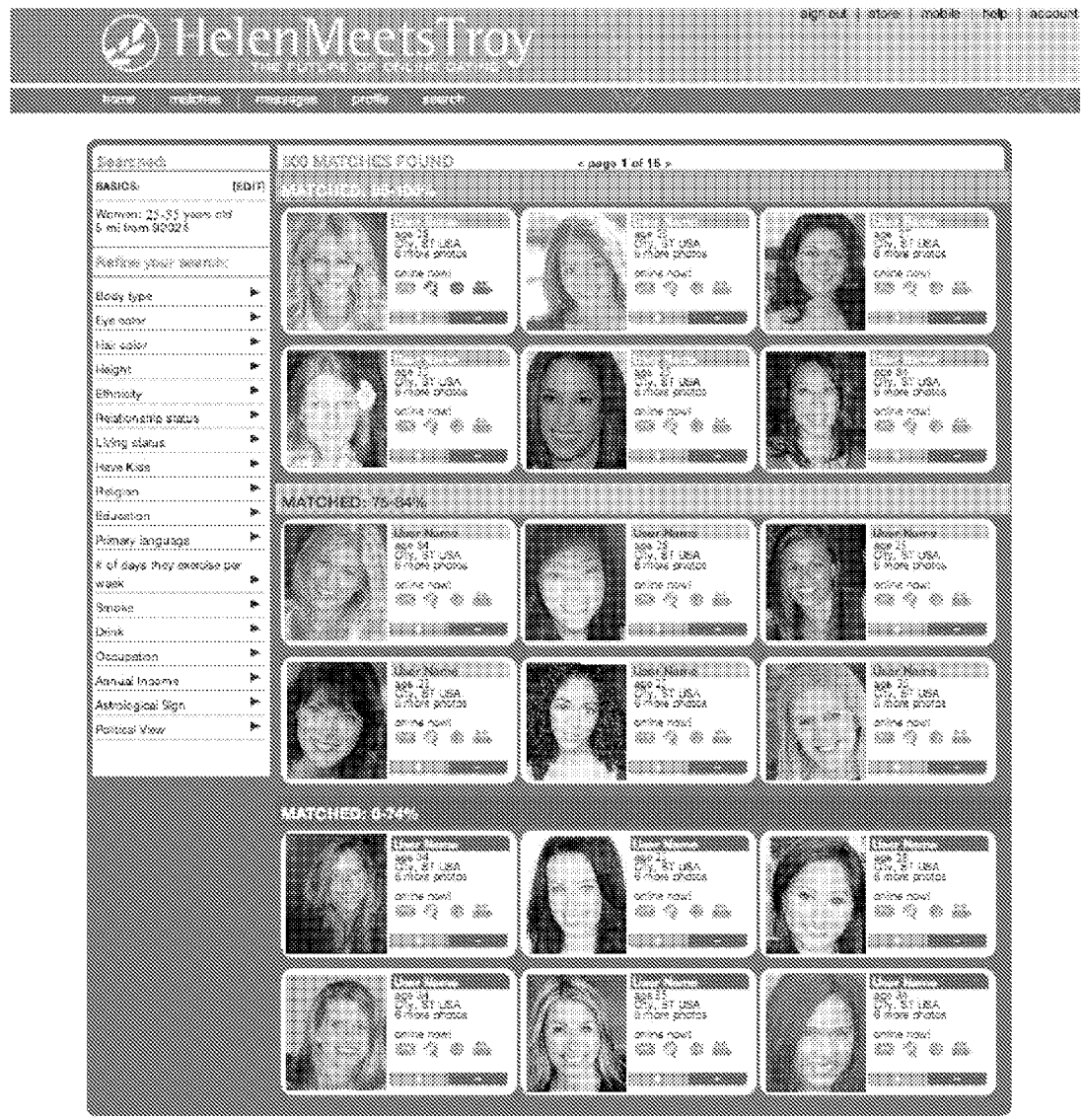
FIG. 6 depicts a sample dating recommendation match list output.

The matched, ranked and organized results from step 209 are stored in results database 104. The stored results data from database 104 are presented as a dating recommendation list in step 210, as illustrated in one embodiment in FIG. 6, to the user 100 via system server 101. This unique approach provides greater ranking accuracy over existing dating recommendation technologies.

Figure 5:
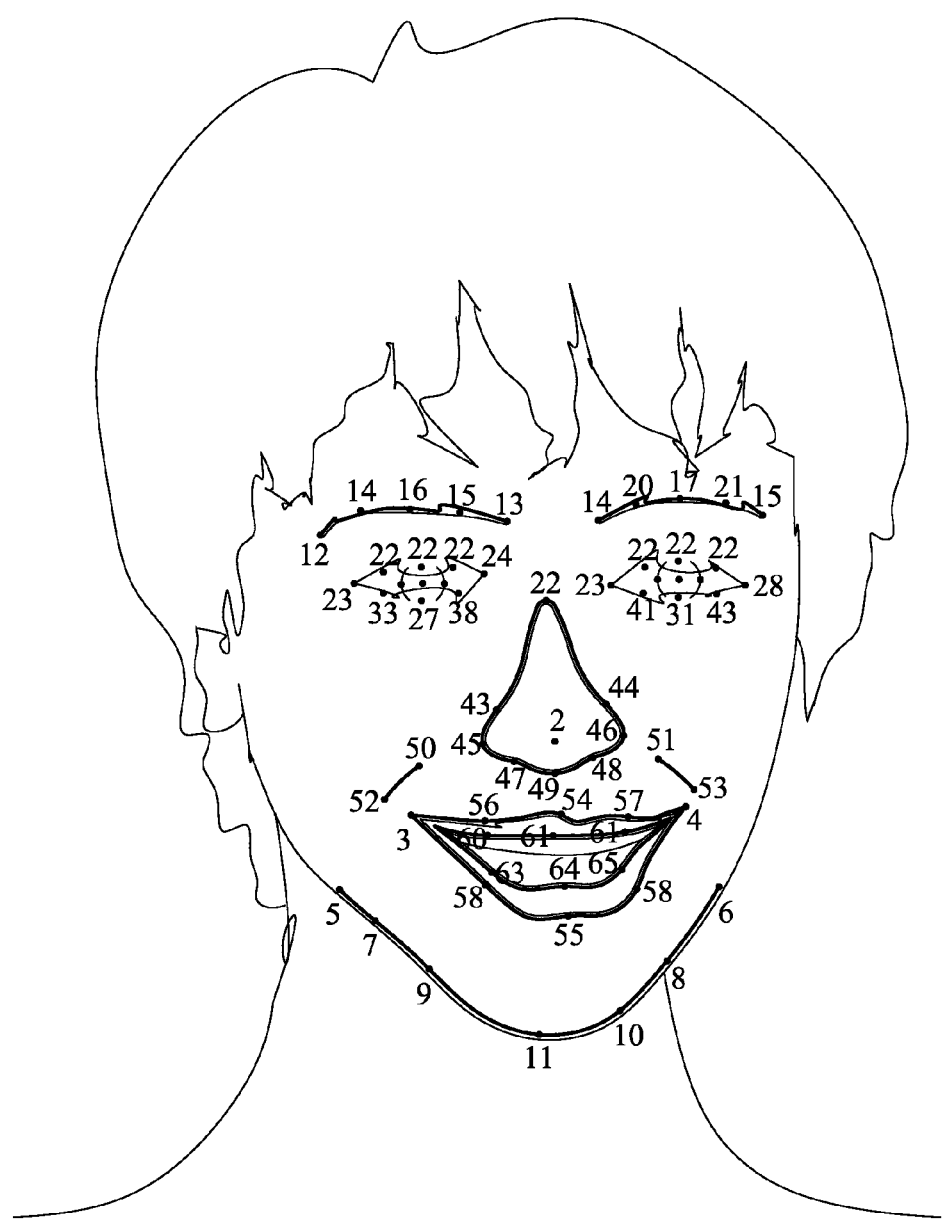
FIG. 5 illustrates a method for mapping face images using facial points on a photograph of a face.

FIG. 5 illustrates a method of face mapping through the numerical assignment of data points on a face from which distance scores can be calculated when compared with the corresponding data points on other faces. In scoring step 207 (shown in FIG. 2), the minimum Face Image Distance Score is determined with respect to each face in the members' processed database 103 from both attractive and unattractive selections and datapoint importance scores stored in 206. A "datapoint" as shown in FIG. 5. is a singular face data point on a grid with an X and Y axis used in computer vision face mapping. The Distance Score is the sum of the distances between each datapoint multiplied by the importance of that datapoint. The member Face Image Distance Score is the minimum of the distance scores calculated for an individual member image using the following formula. The user selects photos for attractiveness, i.e., as attractive or unattractive. For however many attractiveness selections the user has made, each member image in the database will be distance scored against each of those user made attractiveness selections individually. So for example: if a user selected 4 images as attractive and 3 images as unattractive, a distance score will be determined for each member image in the database against each of those 7 selected attractive and unattractive images individually, resulting in 7 different distance scores for that member face image, wherein the minimum of those distance scores is assigned to the member as their Face Image Distance Score for later organizing. The formula for determining each distance score is the following:

$$\begin{aligned}\text{Distance Score}=&(\text{AttractivenessSelectedImage}_1\text{DataPoint}_1-\\&\text{MemberImage}_1\text{DataPoint}_1)\times\text{Importanceof-}\\&\text{DataPoint}_1+\\&(\text{AttractivenessSelectedImage}_1\text{DataPoint}_2-\\&\text{MemberImage}_1\text{markDataPoint}_2)\times\\&\text{ImportanceofDataPoint}_2+\\&(\text{AttractivenessSelectedImage}_1\text{DataPoint}_3-\\&\text{MemberImage}_1\text{DataPoint}_3)\times\\&\text{ImportanceofDataPoint}_3\ldots\\&(\text{AttractivenessSelectedImage}_1\text{DataPoint}_N-\\&\text{MemberImage}_1\text{DataPoint}_N)\times\text{Importanceof-}\\&\text{DataPoint}_N.\end{aligned}$$

The importance of each datapoint is proportional to the statistical differences for that datapoint between the face images selected as attractive and the face images selected as unattractive. More specifically, the importance of a datapoint will be proportional to the difference in the mean and standard deviation of the datapoint of the attractive and unattractive selected face images. For example for any datapoint Z: Datapoint importance Z=Absolute value ((standard deviation of Z for "attractive" photos)–(standard deviation of Z for "unattractive" photos))+Absolute Value ((mean of Z for "attractive" photos–mean of Z for "unattractive" photos)).

Or, in layperson's terms, statistical difference is broken into A and B: A: standard deviation is a measure of how much variance a variable has. To find the standard deviation of datapoint importance Z the standard deviation is found for datapoint Z among all of the "attractive" faces. The standard deviation is found for datapoint Z among all of the "unattractive" faces. A comparison is made from the result deviation score of the "attractive" to the "unattractive". The importance of the deviation is based on the closeness of the standard deviation from "attractive" to "unattractive" face datapoint Z. The less the deviation between attractive and unattractive face points the less the potential datapoint importance. The mean is measured as well, before determining total importance. B: The mean (average) is found for datapoint Z among all of the attractive "+" faces. The mean (average) is found for datapoint Z among all of the unattractive "−" faces. The difference is calculated between the mean score of the attractive "+" faces and the mean score of the unattractive "−" faces, i.e., subtract one from the other. That difference score along with the standard deviation score, is what determines the datapoint importance Z.

The dating recommendation list presentation 210 (as illustrated in one embodiment in FIG. 6) presents the stored organized data from results database 104 to user 100 through system server 101. User 100 may continue to make attractive "+" and/or unattractive "−" selections from the dating recommendation list presentation 210. The new attractive "+" and unattractive "−" selections made by user 100 are stored in the attractive and unattractive database 204. When attractive and unattractive database 204 stores new data, it processes all stored attractive "+" and unattractive "−" data from database 204 for updated datapoint importance scores in step 205. The process continues the same as above in order to produce an updated dating recommendation list 210'. The new dating recommendation list presentation 210' may result in additional attractive and unattractive selections by user 100, in which case those selections continue through the above described process resulting in another dating recommendation list presentation 210' and the possibility of the user making additional attractive and unattractive selections from that dating recommendation list, in which case the process continues as before.

While the vision based dating recommendation method of the present invention has been described in terms of a dating services implemented over a public network, such as the Internet, the method of the present invention can be implemented also over a private network and even without a network. One more steps of the method may be implemented by way of hardware and software, and in most cases many of the steps of the method of the invention will be. Such hardware would include but not be limited to, for example, general-purpose computers, personal computers, special-purposes computers, work stations, servers, data storage devices including all forms of writable media as for example hard drives, and graphic user interfaces, Software would include but not be limited to, for example, software applications, computer programs, and code stored on media. Such hardware and software may be and generally will be integrated into a system and any combination of hardware and software is envisioned to carry out one or more steps of the method of the instant invention. It should also be understood that known communication methods and protocols that itself include all varieties of hardware and software can be used to carry out those steps in which information is communicated to and from the user and between databases, servers and information processors.

Further, while specific mapping, statistical, matching or organizing methods have been described above with respect to preferred embodiments, those possessing ordinary skill in the art will appreciate that the invention can be used with other known and understood mapping, statistical, matching or organizing methods without departing from the spirit and scope of the claimed subject matter.

In addition, while the invention has been described in terms of a dating recommendation method and service, the invention can also be applied in other contexts where identifying persons or face types that are attractive to one or more given users may be important or useful as, for example, by advertising agencies and public relations companies, casting directors and the like.

I claim:

1. A method for providing to a user dating recommendations from a database of individuals available for dating that includes face images of said individuals, wherein one or more of the following steps are carried out by computers, processors, computer programs or electronic data or memory devices not a transient electronic signal:
   (a) mapping each face image in said database into data points;
   (b) based upon the mapped face data generating an objectively diverse seed group of database face images;
   (c) having the user select from said objectively diverse seed group of face images those images the user finds attractive or unattractive;
   (d) determining the importance of the mapped face data by the extent to which data points are proportional to the statistical differences for the mapped face images selected by the user as attractive and the mapped face images selected by the user as unattractive;
   (e) scoring each face image in the database based upon the importance of the mapped face data; and
   (f) organizing the database of face images into a dating recommendation list based upon said scoring.

2. The method of claim 1, further comprising the steps of:
   (g) presenting said dating recommendation list to said user for selection of images the user finds as attractive or unattractive;
   (h) re-determining the importance of the mapped face data based upon the images the user identified as attractive or unattractive within the seed group together with the images the user identified as attractive or unattractive within said dating recommendation list;

(i) re-scoring each face image in the database based upon the importance of the mapped face data as re-determined;
(j) re-organizing the database of face images into a dating recommendation list based upon said re-scored face images; and
(k) repeating steps (g) through (j) as desired.

3. The method of claim 1, wherein the step of generating an objectively diverse seed group of face images comprises:
(a) randomly choosing a first seed group face image from the mapped images within the database of face images;
(b) based upon the mapped face data of said first chosen seed group face image, choosing a second seed group face image having mapped data least like the mapped data of the first seed group face image;
(c) based upon the mapped data of the seed group face images already chosen, choosing the next seed group face image having mapped data least like the mapped data of those seed group face images already chosen;
(d) repeating step (c) until the desired number of objectively diverse seed group face images are chosen.

4. The method of claim 1, wherein the user rates each seed group image using a scale of attractiveness and unattractiveness that is greater than binary and wherein the importance of the mapped face data is determined using said greater than binary rating scale information.

5. The method of claim 1, wherein the importance of the mapped face data is determined in step (d) by the difference between the standard deviation and the mean for each face data point, as measured on a grid containing an X and Y axis, which is calculated as follows:

Importance of face data point Z=Absolute value ((standard deviation of Z for "attractive" photos)−(standard deviation of Z for "unattractive" photos))+Absolute Value (mean of Z for "attractive" photos−mean of Z for "unattractive" photos);

(e) scoring each face image in the database taking into consideration the data point distances and said importance of mapped face data; and
(f) organizing the database of face images into a dating recommendation list based upon said scoring.

6. The method of claim 1, wherein the scoring of each face image in the database is calculated in step (e) as follows:
Distance Score=(AttractivenessSelectedImage1DataPoint1−MemberImage1DataPoint1)×ImportanceofDataPoint1+(AttractivenessSelectedImage1DataPoint2−MemberImage1DataPoint2)×ImportanceofDataPoint2+(AttractivenessSelectedImage1DataPoint3−MemberImage1DataPoint3)×ImportanceofDataPoint3 . . . (AttractivenessSelectedImage1DataPointN−MemberImage1DataPointN)×ImportanceofDataPointN, determining the minimum Distance Score with respect to each member image of the distance scores calculated for each individual member image using the above formula.

7. The method of claim 1, wherein said database further includes narrative information about each individual and the user that is useful in determining personal compatibility, wherein said narrative information for each individual is compared with said narrative information for said user, and said narrative information for each individual is scored relative to the user, and wherein the scored narrative information of each individual is combined with the face image score of each individual to organize the dating recommendation list for said user.

8. The method of claim 1, wherein said database further includes narrative information about each individual available for dating and the user, that is used to determine and score personal compatibility, wherein said narrative information for each individual is compared with said narrative information for said user and scored relative to the user, wherein the scored narrative information of each individual is used to organize individuals in the database into subgroups, wherein the subgroups are determined by the ranking of one, or more, or all of the items of narrative information, and wherein the individuals within each sub-group are organized based upon said face image score from most attractive to least attractive to the user.

9. The method of claim 1, wherein the interaction with the user takes place over a private or public computer network.

10. The method of claim 1, wherein the step of generating an objectively diverse seed group of database face images is carried out independent of any user input.

11. A computer-usable medium, not a transient electronic signal, storing a computer program, the computer program including instructions for causing a computer to perform at least some of the following operations on a database of face images representing individuals available for dating:
(a) mapping each face image in said database into data points;
(b) based upon the mapped face data generating an objectively diverse seed group of face images from among the database of face images;
(c) having the user select from said objectively diverse seed group of face images those images the user finds attractive or unattractive;
(d) determining the importance of the mapped face data by the extent to which data points are proportional to the statistical differences for the mapped face images selected by the user as attractive and the mapped face images selected by the user as unattractive;
(e) scoring each face image in the database based upon the importance of the mapped face data; and
(f) organizing the database of face images into a dating recommendation list based upon said scoring.

12. A system for providing to a user a recommendation dating list from a database of face images representing individuals available for dating, implemented over a public or private network, comprising computers, processors, computer programs, and electronic data or memory storage devices not a transient electronic signal, performing one or more of the following steps on said database of face images:
(a) mapping each face image in said database into data points;
(b) based upon the mapped face data generating an objectively diverse seed group of face images from among the database of face images;
(c) having the user select from said objectively diverse seed group of face images those images the user finds attractive or unattractive;
(d) determining the importance of the mapped face data by the extent to which data points are proportional to the statistical differences for the mapped face images selected by the user as attractive and the mapped face images selected by the user as unattractive;
(e) scoring each face image in the database based upon the importance of the mapped face data; and
(f) organizing the database of face images into a dating recommendation list based upon said scoring.

* * * * *